US 8,572,581 B2
Oct. 29, 2013

(12) United States Patent
Shafi et al.

(10) Patent No.: US 8,572,581 B2
(45) Date of Patent: Oct. 29, 2013

(54) MEASUREMENT AND REPORTING OF PERFORMANCE EVENT RATES

(75) Inventors: Hazim Shafi, Redmond, WA (US); Khaled S. Sedky, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 855 days.

(21) Appl. No.: 12/411,435

(22) Filed: Mar. 26, 2009

(65) Prior Publication Data

US 2010/0251160 A1 Sep. 30, 2010

(51) Int. Cl.
*G06F 9/44* (2006.01)

(52) U.S. Cl.
USPC ............ 717/131; 717/125; 717/127; 717/128

(58) Field of Classification Search
None
See application file for complete search history.

(56) References Cited

U.S. PATENT DOCUMENTS

| | | | |
|---|---|---|---|
| 6,330,008 B1 | 12/2001 | Razdow et al. | |
| 6,332,212 B1 * | 12/2001 | Organ et al. | 717/128 |
| 6,360,337 B1 | 3/2002 | Zak et al. | |
| 6,658,654 B1 * | 12/2003 | Berry et al. | 717/131 |
| 7,698,686 B2 * | 4/2010 | Carroll et al. | 717/125 |
| 7,920,649 B2 * | 4/2011 | Shoor et al. | 375/316 |
| 7,987,345 B2 * | 7/2011 | Silyaev et al. | 712/227 |
| 8,089,492 B2 * | 1/2012 | Titmuss et al. | 345/594 |
| 2002/0156825 A1 | 10/2002 | Hoover et al. | |
| 2005/0155019 A1 * | 7/2005 | Levine et al. | 717/127 |
| 2008/0049043 A1 * | 2/2008 | Titmuss et al. | 345/589 |
| 2008/0092121 A1 | 4/2008 | DeRose et al. | |
| 2008/0162272 A1 * | 7/2008 | Huang et al. | 717/127 |
| 2008/0180382 A1 * | 7/2008 | Hao et al. | 345/100 |
| 2008/0189687 A1 * | 8/2008 | Levine et al. | 717/128 |
| 2008/0209402 A1 * | 8/2008 | Parkinson | 717/124 |
| 2008/0240318 A1 * | 10/2008 | Shoor et al. | 375/355 |
| 2008/0301700 A1 | 12/2008 | Junkins et al. | |
| 2009/0089014 A1 * | 4/2009 | Silyaev et al. | 702/186 |
| 2009/0125891 A1 * | 5/2009 | Garimella et al. | 717/131 |
| 2009/0150874 A1 * | 6/2009 | Chung et al. | 717/151 |
| 2010/0107143 A1 * | 4/2010 | Emberling | 717/128 |
| 2011/0161934 A1 * | 6/2011 | Thomson et al. | 717/125 |

OTHER PUBLICATIONS

Sameer S. Shende, The Tau Parallel Performance System, The International Journal of High Performance Computing Applications, vol. 20, No. 2, Summer 2006, pp. 287-311, <http://www.cs.uoregon.edu/Research/paracomp/papers/ijhpca05.tau/ijhpca_tau.pdf>.*

Jeremy Lau, Selecting Software Phase Markers with Code Structure Analysis, 0-7695-2499-0/06 2006 IEEE, 12 pages, <http://dl.acm.org/citation.cfm?id=1122399>.*

(Continued)

*Primary Examiner* — Thuy Dao
*Assistant Examiner* — Cuong V Luu
(74) *Attorney, Agent, or Firm* — Toler Law Group, PC

(57) ABSTRACT

Methods and systems are disclosed for measuring performance event rates at a computer and reporting the performance event rates using timelines. A particular method tracks, for a time period, the occurrences of a particular event at a computer. Event rates corresponding to different time segments within the time period are calculated, and the time segments are assigned colors based on their associated event rates. The event rates are used to display a colored timeline for the time period, including displaying a colored timeline portion for each time segment in its associated color.

20 Claims, 8 Drawing Sheets

(56) References Cited

OTHER PUBLICATIONS

Holger Brunst et al., The Vampir Performance Analysis Tool-Set; 2008 Springer, pp. 139-155; <http://link.springer.com/content/pdf/10.1007%2F978-3-540-68564-7_9.pdf>.*

Jerry C. Yan; Performance Tuning with AIMS An Automated Instrumentation and Monitoring System for Multicomputers; 1994 IEEE; 9 pages; <http://pdf.aminer.org/000/249/028/performance_tuning_with_aims_an_automated_instrumentation_and_monitoring_system.pdf>.*

Jerry Yan et al.; Performance Measurement, Visualization and Modeling of Parallel and Distributed Programs using the AIMS Toolkit; 1995 John Wiley & Sons, Ltd.; <http://onlinelibrary.wiley.com/doi/10.1002/spe.4380250406/abstract>.*

Zoltán Balaton et al; Application Monitoring in the Grid with GRM and PROVE; 2001 ICCS; pp. 253-262; <http://link.springer.com/content/pdf/10.1007%2F3-540-45545-0_34.pdf>.*

Henry C. Lucas; Performance Evaluation and Monitoring; 1971 Computing Surveys; pp. 79-91; <http://dl.acm.org/citation.cfm?id=356590>.*

Kathleen M. Nichols; Performance Tools; 1990 IEEE; pp. 21-30; <http://ieeexplore.ieee.org/stamp/stamp.jsp?tp=&arnumber=55223>.*

DeRose Luiz A. "The Hardware Performance Monitor Toolkit", Retrieved at<<http://www.springerlink.com/content/v7knfclw30yj23a2/fulltext.pdf?page=1>>, Euro-Par 2001, LNCS 2150,p. 1.

"Tuning and Analysis Utilities", Retrieved at<<http://www.cs.uoregon.edu/research/tau/home.php>>, Jan. 20, 2009, pp. 2.

"A Graphical Performance Analysis Environment for Performance Tuning and Visualization", Retrieved at<<http://www.renci.org/focusareas/completed/pablo.php>>, Jan. 20, 2009, p. 1.

"Vampir ", Retrieved at<<http://www.vampir.eu/flyer/vampir_SC2008.pdf>>, p. 1, 2008.

Rose, et al. "SvPablo: A Multi-language Performance Analysis System", Retrieved at<<http://www.springerlink.com/content/xgpb1n9rhvvl4vrh/>>, Tools'98, LNCS 1469, pp. 352-355, 1998.

"Performance Visualization", Retrieved at<<http://www.lib.unb.ca/engineering/usenix/04vm/tech/full_papers/sweeney/sweeney_html/main_26.html>>, Jan. 20, 2009, p. 1.

Lau et al, "Selecting Software Phase Markers with Code Structure Analysis", Retrieved at <<http://www.cse.ucsd.edu/~calder/papers/CGO-06-PhaseMarkers.pdf >>, 2006, pp. 12.

"3-D Scatter Plot", Retrieved at <<http://www.cs.uoregon.edu/research/tau/docs/paraprof/ch03s03.html>>, p. 1, 2005.

"Thread Statistics Table", Retrieved at <<http://www.cs.uoregon.edu/research/tau/docs/paraprof/ch04s03.html>>, pp. 3, 2005.

* cited by examiner

MEASUREMENT AND REPORTING OF PERFORMANCE EVENT RATES

BACKGROUND

Software application performance is a factor considered by potential purchasers and users of software. Performance analysis and performance improvement have become part of the software development and testing process. One way of measuring the performance of software is by using hardware performance counters in a computer that executes the software. However, the use of hardware performance counters may not provide an indication of how performance varies over time or how performance relates to particular software source code.

Performance analysis of software is further complicated since many modern computing systems execute applications on multiple processing cores and across multiple processing threads. Thus, understanding the performance impact of each individual thread or core is often a complicated and time-consuming task.

SUMMARY

The present disclosure describes tools for measuring and reporting performance event rates at a computer. Occurrences of one or more selected performance events are tracked at a computer (e.g., by periodically sampling one or more hardware performance counters at the computer) for a time period. Based on the tracked occurrences, event rates are calculated for different time segments within the time period. In one embodiment, a particular color of a color palette is associated with each time segment based on the event rate for the time segment. A colored timeline is displayed by displaying each time segment in the color associated with the time segment. Alternatively, the colored timeline may be overlayed on top of thread execution segments corresponding to threads that were executing at the computer during the time period, to correlate the event rates to thread execution.

A performance event rate report may also include advanced functionality, such as the ability to zoom in on one or more timelines, display call stack information for selected portions of timelines or threads, and generate performance reports for selected portions of timelines or threads. A particular embodiment includes inserting phase markers into source code and segmenting the displayed timelines with the phase markers, so that performance event rate information for the source code can easily be identified.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
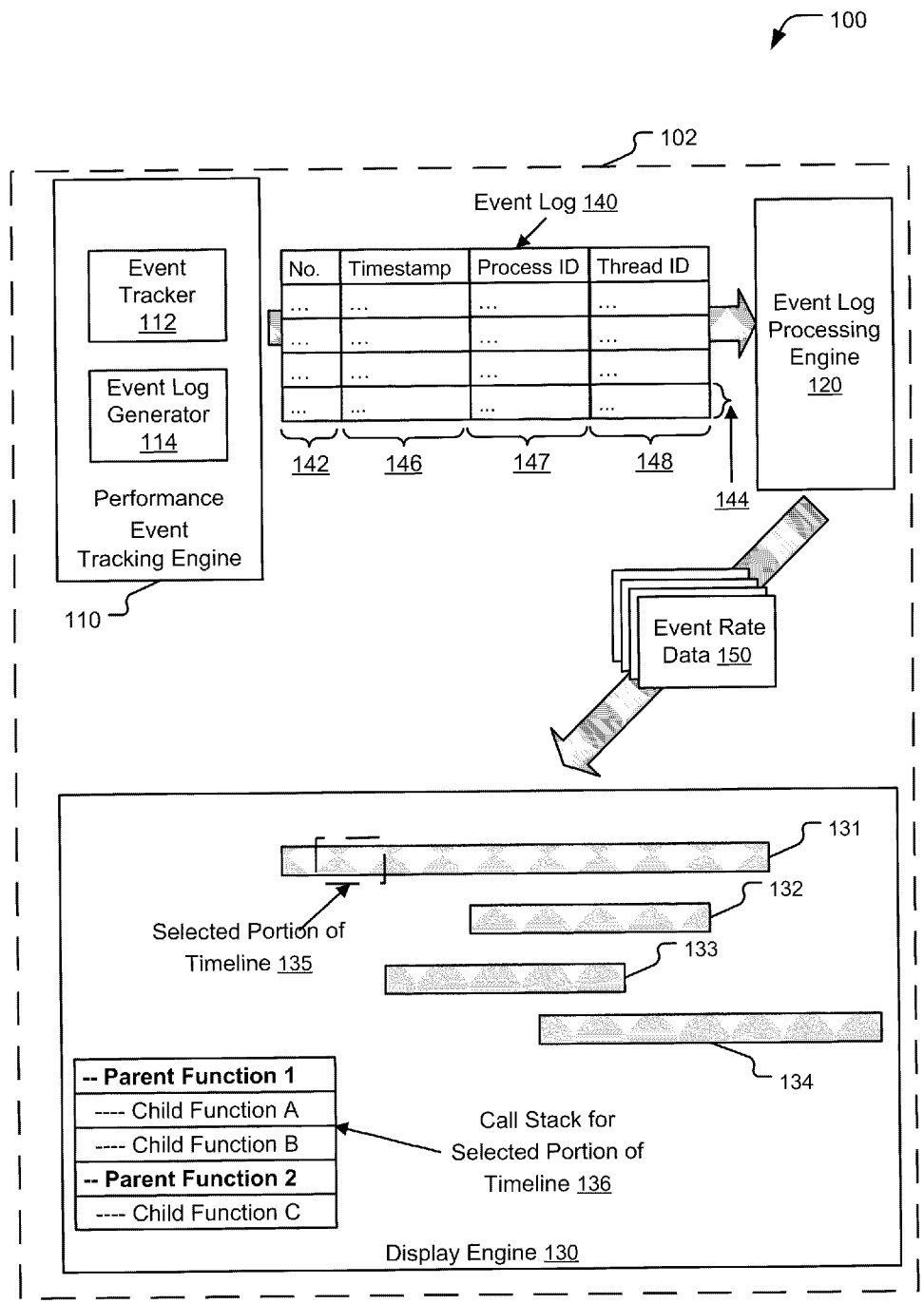
FIG. 1 is a block diagram of a particular embodiment of a system of measuring and reporting performance event rates at a computer.

In a particular embodiment, a system is disclosed that includes a performance event tracking engine, an event log processing engine, and a display engine. The performance event tracking engine is configured to track one or more performance events during execution of each of a plurality of processes on a multi-threaded computer. The performance event tracking engine is further configured to generate an event log for each of the plurality of processes. The event log includes a plurality of records, where each record includes a number of occurrences of the performance event, a timestamp, and a thread identifier. The event log processing engine is configured to calculate event rate data for each process based on the event log for the process. The display engine is configured to simultaneously display a plurality of timelines, where each timeline corresponds to event rate data for a corresponding process. The display engine is further configured to receive a selection of a portion of a particular timeline, display call stack information for the selected portion of the particular timeline, and zoom in on the selected portion of the particular timeline. When one of the processes is multi-threaded, the display engine may be further configured to display, selectively hide, and selectively show a timeline for each thread of the process.

In another particular embodiment, a method is disclosed that includes tracking, for a time period, each occurrence of an event during execution at a computer. The time period includes a plurality of time segments. The method also includes calculating an event rate based on a number of tracked occurrences of the event for each time segment and associating each time segment with a color of a color palette, where the color is determined based on the event rate corresponding to the time segment. The method also includes displaying a colored timeline corresponding to the time period. The colored timeline includes a plurality of color displays, each color display corresponding to a particular time segment and presented in the color associated with the particular time segment.

In another particular embodiment, a method is disclosed that includes receiving sample data for a thread executing on a multi-threaded computer during a time period. The sample data is related to a performance event of the multi-threaded computer and includes a plurality of samples. Each sample indicates a number of occurrences of the performance event during a time period, and each sample has an associated timestamp. The method also includes calculating a plurality of time differences from the sample data, where each time difference is a time difference between two consecutive samples of the plurality of samples. The method further includes calculating a plurality of performance event rates based on the plurality of time differences. The method includes determining a range of the plurality of performance event rates and assigning a color spectrum to the range of performance event rates. The method also includes generating a colored timeline display corresponding to the time period. The colored timeline display is based on the plurality of performance event rates and the color spectrum. The method also includes displaying the colored timeline display at a display device.

FIG. 1 is a block diagram of a particular embodiment of a system 100 of measuring and reporting performance event rates at a computer 102. The computer 102 includes a performance event tracking engine 110 configured to send an event log 140 to an event log processing engine 120. The computer 102 also includes a display engine 130 configured to receive event rate data 150 from the event log processing engine 120. Generally, the system 100 may be used to measure and report performance event rates at the computer 102.

The performance event tracking engine 110 may include an event tracker 112 and an event log generator 114. The event tracker 112 may be configured to track the occurrence of one or more performance events at each process executing at the computer 102. For example, the event tracker 112 may track the occurrence of performance events such as cache misses, cache hits, page faults, disk reads, disk writes, and branch mispredictions at the computer 102. In a particular embodiment, the event tracker 112 tracks the occurrences of performance events at the computer 102 by sampling one or more hardware performance counters at the computer 102. The computer 102 may be a single-core computer, a multi-core computer, a multi-threaded computer, or any combination thereof. When the computer 102 is a multi-core computer, the event tracker 112 may track the occurrence of performance events at each core of the multi-core computer.

The event log generator 114 may be configured to generate the event log 140 based on tracked occurrences of the one or more performance events at the computer 102 by the event tracker 112. In a particular embodiment, the event log 140 may be generated in real-time. In another particular embodiment, the event log 140 may be generated after the event tracker 112 has finished tracking the occurrences of the one or more performance events. When more than one process executes at the compute 102 when the performance event tracking engine 110 collects performance data, a separate event log 140 may be generated for each process. The performance event tracking engine 110 may be configured to send the event log 140 generated by the event log generator 114 to the event log processing engine 120.

The event log 140 includes performance data collected by the event tracker 112. In a particular embodiment, the event log 140 includes a plurality of records, such as the record 144 that includes a number of performance event occurrences 142, a timestamp 146, and a process identifier (ID) 147. In a particular embodiment where the computer 102 is a multi-threaded computer, the record 144 also includes a thread ID 148.

The event log processing engine 120 may be configured to receive the event log 140 from the performance event tracking engine 110 and use the event log 140 to generate the event rate data 150. The event log processing engine 120 may also be configured to send the event rate data 150 to the display engine 130. The event rate data 150 may indicate the rate of change in the number of performance event occurrences 142 in the event log 140. The event log processing engine 120 may also group the event rate data 150 by process, by thread, by time period, or in any other manner. When the computer 102 is a multi-core computer, the event rate data 150 may also be grouped by processing core.

The display engine 130 may be configured to receive the event rate data 150 from the event log processing engine 120 and use the event rate data 150 to display performance rate information related to the computer 102. The performance event rate information related to the computer 102 may be displayed by the display engine 130 in the form of timelines, such as the timelines 131, 132, 133, and 134. Each particular timeline may correspond to a particular process or a particular thread at the computer 102. In particular embodiment, the timelines 131-134 may be colored timelines that each include multiple colored time segments, where the color of each time segment indicates a performance event rate during a time period corresponding to the time segment. Particular methods of assigning colors to performance event rates are further described herein with reference to FIG. 3 and FIG. 7.

The display engine 130 may also receive and respond to a selection of one or more portions of the timelines 131-134. For example, in the particular embodiment illustrated in FIG. 1, the display engine 130 may receive a selection of a selected portion 135 of the timeline 131. The display engine 130 may be configured to display call stack information for a selected timeline portion. For example, in the particular embodiment illustrated in FIG. 1, the display engine 130 displays call stack information 136 for the selected portion 135 of the timeline 131. In a particular embodiment, the display engine 130 is further configured to zoom in on, selectively hide, and selectively show each of the timelines 131-134. When the computer 102 is a multi-threaded computer capable of executing multi-threaded processes, a timeline for a multi-threaded process may include multiple channels, where each channel corresponds to a particular thread. In such an embodiment, the display engine 130 may be further configured to zoom in on, selectively hide, and selectively show each individual channel of the timeline corresponding to the multi-threaded process.

In operation, the event tracker 112 at the performance event tracking engine 110 tracks the occurrence of one or more performance events at the computer 102. For example, the event tracker 112 may track cache misses at the computer 102 for a fixed time period. In a particular embodiment, the event tracker 112 may receive user input indicating what performance events should be tracked at the computer 102 and may configure one or more hardware performance counters at the computer 102 to track the indicated performance events. For example, the event tracker 112 may receive user input indicating that cache misses at the computer 102 should be tracked and configure a hardware performance counter at the computer 102 to count cache misses. The event tracker 112 may then track cache misses by sampling the configured hardware performance counter at the computer 102. The configured hardware performance counter may be sampled periodically, randomly, or in any other manner.

The event log generator 114 may generate the event log 140 from the performance data collected by the event tracker 112. For example, the event log generator 114 may generate the event log 140. Each record 144 of the event log 140 corresponds to a particular sample of the hardware performance counter configured to count cache misses at the computer 102. In such an embodiment, each record 144 in the event log 140 may indicate the value of the hardware performance counter (i.e., the number of performance event occurrences 142) as measured at a particular point in time (i.e., the timestamp 146) when a particular thread was executing (i.e., the thread ID 148). Once the fixed time period has elapsed, the performance event tracking engine 110 may send the generated event log 140 to the event log processing engine 120.

The event log processing engine 120 may use the received event log 140 to generate the event rate data 150. For example, when two consecutive records in the event log are "5 cache misses|2 seconds|Thread 1453" and "10 cache misses|4 seconds|Thread 1453", then the event rate data may indicate that there were an average of 2.5 cache misses per second in thread 1453 during the time period beginning at 2 seconds and ending at 4 seconds. The event log processing engine 120 may generate such event rate data 150 for each pair of consecutive records in the event log 140. After generating the event rate data 150, the event log processing engine 120 may send the event rate data 150 to the display engine 130.

The display engine 130 may display the timelines 131-134 based on the event rate data 150. In a particular embodiment, the display engine 130 may display the timelines 131-134 at a display device of the computer 102. For example, the event rate data 150 may include event rate data for each of four threads executing at the computer 102, and each of the timelines 131-134 may correspond to event rate data 150 for a particular thread of the four threads.

The display engine 130 may also provide detailed information for selected portions of the timelines 131-134. In the particular embodiment illustrated in FIG. 1, the display engine 130 has received a selection of the selected portion 135 of the timeline 131 and has displayed call stack information 136 for the selected portion 135. In the particular embodiment illustrated in FIG. 1, the call stack information 136 indicates that during a time period corresponding to the selected portion 135 of the timeline 131, two parent functions were called. First, Parent Function 1 was called, which in turn called two child functions, namely Child Function A and Child Function B. Next, Parent Function 2 was called, which in turn called a Child Function C. The call stack information 136 may be used to correlate the performance event rates displayed in the selected portion 135 of the timeline 131 to application source code (e.g., the parent functions and child functions shown in the call stack information 136).

In a particular embodiment, the event tracker 112 collects call stack information each time a performance event occurs and includes such call stack information in the event log 140. The call stack information may be a collection of instruction pointers that indicate a call path that was taken immediately prior to the occurrence of the performance event.

It will be appreciated that the system 100 of FIG. 1 enables the measurement and display of performance event rates at the computer 102. Thus, the system 100 of FIG. 1 enables a user to not just monitor how many times a performance event (e.g., a cache miss) occurs during a particular time period, but also shows how the rate of the performance event (e.g., the rate of cache misses) varies over the time period, varies across process timelines, and varies across thread channels. It will further be appreciated that when the user has access to software source code corresponding to executing processes and threads, the system 100 of FIG. 1 further enables a user to pinpoint what particular portions of software source code correspond to what performance event rates. For example, the user may be able to use the system 100 of FIG. 1 to determine what particular source code module of an application causes the highest rate of cache misses at the computer 102, and the user may use such information to improve the performance of the particular software module, and thereby improve the performance of the overall application.

Figure 2:
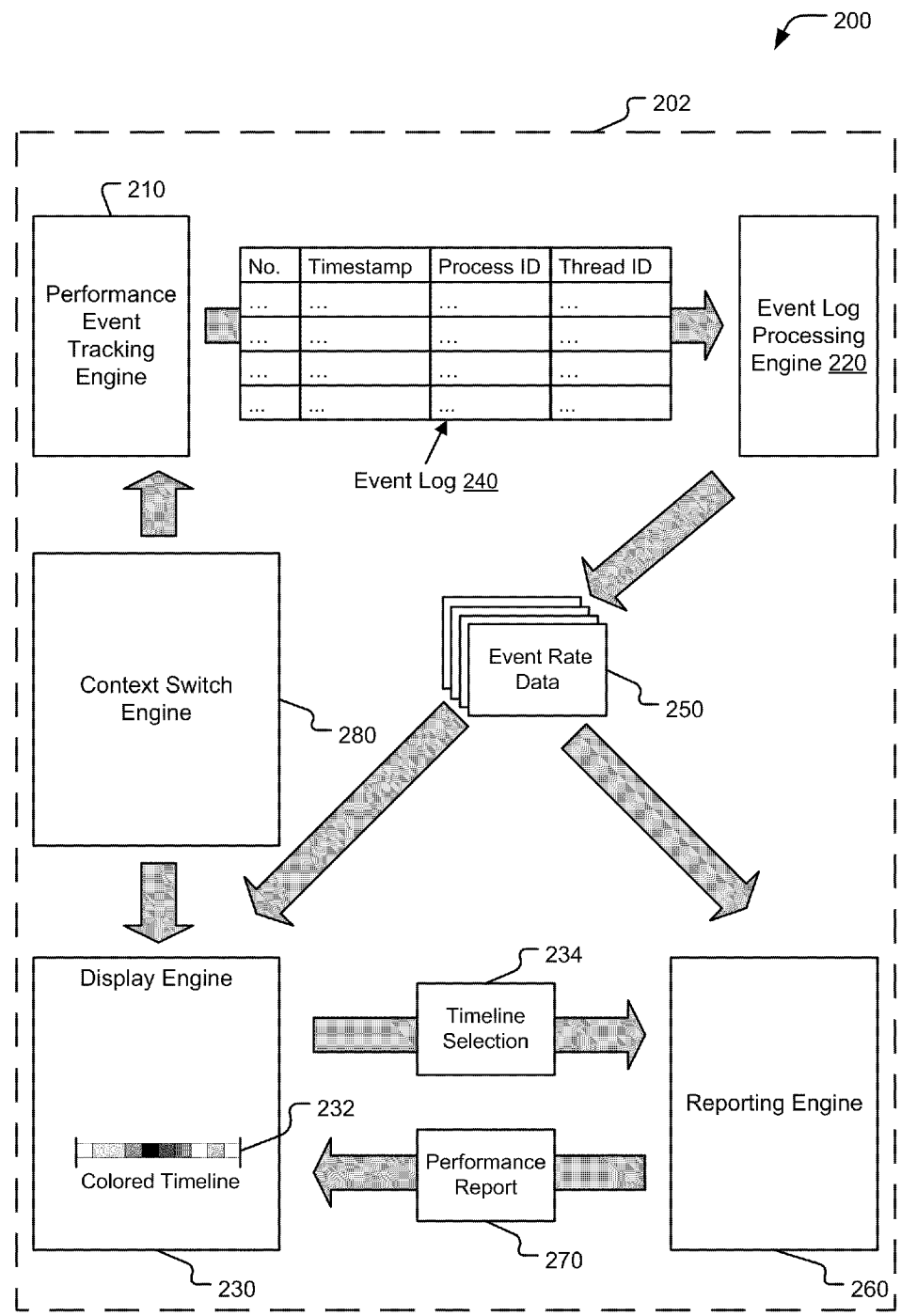
FIG. 2 is a block diagram of another particular embodiment of a system of measuring and reporting performance event rates at a computer.

FIG. 2 is a block diagram of another particular embodiment of a system 200 of measuring and reporting performance event rates at a computer 202. The computer 202 includes a performance event tracking engine 210 configured to send an event log 240 to an event log processing engine 220. The computer 202 also includes a display engine 230 configured to receive event rate data 250 from the event log processing engine 220. The computer 202 further includes a reporting engine 260 configured to receive selections of timeline portions from the display engine 230, to receive the event rate data 250 from the event log processing engine 220, and to send a performance report 270 for the selected timeline portions to the display engine 230. When the computer 202 is a multi-threaded computer, the computer 202 also includes a context switch engine 280 to detect when a particular thread at the computer 202 begins and ends execution and to send such information to the performance event tracking engine 210 and to the display engine 230. In an illustrative embodiment, the performance event tracking engine 210 may include the performance event tracking engine 110 of FIG. 1, the event log processing engine 220 may include the event log processing engine 120 of FIG. 1, and the display engine 230 may include the display engine 130 of FIG. 1.

The performance event tracking engine 210 may be configured to track the occurrence of one or more performance events at each process executing at the computer 202. In a particular embodiment, the performance event tracking engine 210 may track the one or more performance events by sampling one or more hardware performance counters at the computer 202. The performance event tracking engine 220 may also be configured to generate the event log 240 based on the tracked occurrences of the one or more performance events. The generated event log 240 may be sent to the event log processing engine 220.

The event log 240 may include measured performance data collected by the performance event tracking engine 210. In a particular embodiment, the event log 240 includes a plurality of records, where each record includes a number of performance event occurrences and a timestamp that indicates when the number of performance event occurrences was measured. In a particular embodiment where the computer 202 is a multi-threaded computer, each record also includes a thread identifier (ID).

The event log processing engine 220 may be configured to receive the event log 240 from the performance event tracking engine 210 and to generate the event rate data 250 based on the event log 240. The event log processing engine 220 may also be configured to send the generated event rate data 250 to the display engine 230 and to the reporting engine 260.

When the computer 202 is a multi-threaded computer, the context switch engine 280 may be configured to detect when a particular thread at the computer 202 begins and ends execution. Thus, the context switch engine 280 may identify execution time periods for each thread at the computer 202. The context switch engine 280 may send the information related to the identified execution time periods to the performance event tracking engine 210, and the performance event tracking engine 210 may use such information to determine the thread ID for each record in the event log 240. The context switch engine 280 may also send the information related to the identified execution time periods to the display engine 230.

The display engine 230 may be configured to receive the event rate data 250 from the event log processing engine 220 and may use the event rate data 250 to display performance event timelines, such as an illustrative colored timeline 232, at a display device of the computer 202. The timelines may correspond to particular processes or particular threads executing at the computer 202 when the performance event tracking engine 210 collected performance data. In a particular embodiment, the timelines may include multiple colored time segments, where the color of each time segment indicates a performance event rate during a time period corresponding to the time segment. The display engine 230 may also receive selections of one or more portions of the displayed timeline and send the timeline selections to the reporting engine 260. The display engine 230 may also receive the performance report 270 related to the timeline selections from the reporting engine 260, and display the performance report 270 at a display device of the computer 202. The display engine 230 may also be configured to zoom in on, selectively hide, and selectively show each displayed timeline. In a particular embodiment, the display engine 230 is configured to use the execution time period information from the context switch engine 280 to selectively hide or show performance event rate information for particular execution time periods. When the performance event tracking engine 210 collects performance event data for a multi-threaded process, the display engine 230 may further be configured to use the execution time period information to selectively display portions of a particular channel associated with a particular thread of the multi-threaded process, where the displayed portions correspond to time period during which the particular thread was executing.

The reporting engine 260 may be configured to receive the event rate data 250 from the event log processing engine 220 and filter the event rate data 250 based on the timeline selections received from the display engine 230. The reporting engine 260 may further be configured to generate a performance report 270, where the performance report 270 includes portions of the event rate data 250 that are particular to the timeline selections. For example, the performance report 270 may identify an execution time period, provide performance event rates, and provide call stack information for each timeline selection. In a particular embodiment, the performance report 270 may also identify one or more software source code modules that were executing during time periods corresponding to the timeline selections.

In operation, the performance event tracking engine 210 may track the occurrence of one or more performance events at the computer 202 for a fixed time period. For example, the performance event tracking engine 210 may track branch mispredictions at the computer 202 for a particular fixed time period. The performance event tracking engine 210 may also generate the event log 240 based on the tracked occurrences of the one or more performance events. In a particular embodiment, the performance event tracking engine 210 may receive thread execution time period information from the context switch engine 280 and use such information to populate the Thread ID column of the event log 240. When the performance event tracking engine 210 tracks more than one performance event, each record in the thread log 240 may also indicate what particular performance event the record refers to. For example, when different performance events are tracked by different hardware performance counters, each record in the event log 240 may indicate the particular hardware performance counter that was sampled to generate the record. The performance event tracking engine 210 may send the event log 240 to the event log processing engine 220 once the fixed time period has elapsed.

The event log processing engine 220 may use the received event log 240 to generate the event rate data 250. For example, when two consecutive records in the event log 240 are "0 branch mispredictions|0 seconds|Thread 2100" and "30 branch mispredictions|6 seconds|Thread 210038 , the event rate data 250 may indicate that there were an average of 5 branch mispredictions per second in thread 2100 during the time period beginning at 0 seconds and ending at 6 seconds. The event log processing engine 220 may send the event rate data 250 to the display engine 230 and to the reporting engine 260.

It should be noted that events may be tracked and noted in the event log 240 in different ways. For example, the performance event tracking engine 210 may write a record to the event log 240 every N occurrences of the event, such that the time period between records varies, but the number of event occurrences between records does not vary. Alternatively, the performance event tracking engine 210 may write a record to the event log 240 every N seconds, such that the time period between records does not vary, but the number of event occurrences between records varies.

The display engine 230 may display the event rate data 250 in the form of one or more timelines at a display device of the computer 202. For example, the display engine 230 may display the colored timeline 232 corresponding to the fixed time period from 0 to 6 seconds, where each time segment of the colored timeline is displayed in a color that indicates the rate of branch mispredictions during a time period corresponding to the time segment. Particular methods of assigning colors to performance event rates are further described herein with reference to FIG. 3 and FIG. 7.

The display engine 230 may also provide advanced reporting capability. For example, the display engine 230 may receive a timeline selection 234 of the colored timeline 232, send the timeline selection 234 to the reporting engine 260, receive a performance report 270 specific to the timeline selection 234 from the reporting engine 260, and display the received performance report 270. The display engine 230 may also provide the ability to zoom in on, selectively hide, and selectively show the colored timeline 232. In a particular embodiment, the display engine 230 may also receive thread execution time period information from the context switch engine 280 and may use such information to selectively hide and show performance event rate information for particular execution time periods. It will be appreciated that in such an embodiment, the event log 240 may no longer need to include the thread ID column, thereby saving space. For example, the display engine 230 may selectively hide and show branch misprediction rate information for time periods when Thread 2100 was executing. As an example, if branch mispredictions were tracked for a fixed time period from 0 seconds to 10 seconds, and Thread 2100 only executed from the time 0 seconds to 6 seconds, then the display engine 230 may selectively show branch misprediction rate information for the time period 0 seconds to 6 seconds and may selectively hide branch misprediction rate information for the time period 6 seconds to 10 seconds.

It will be appreciated that the system 200 of FIG. 2 enables the measurement and display of performance event rate information at the computer 202. It will further be appreciated that the system 200 of FIG. 2 provides the ability to isolate performance event rate information for execution time periods of a particular thread, as well as the ability to generate a performance report for the particular thread. This gives users at the computer 202 the ability to selectively view performance information for execution time periods of only those threads or of specific events that are meaningful to the users. Thus, the system 200 of FIG. 2 may improve the process of identifying and resolving performance bottlenecks at the computer 202.

Figure 3:
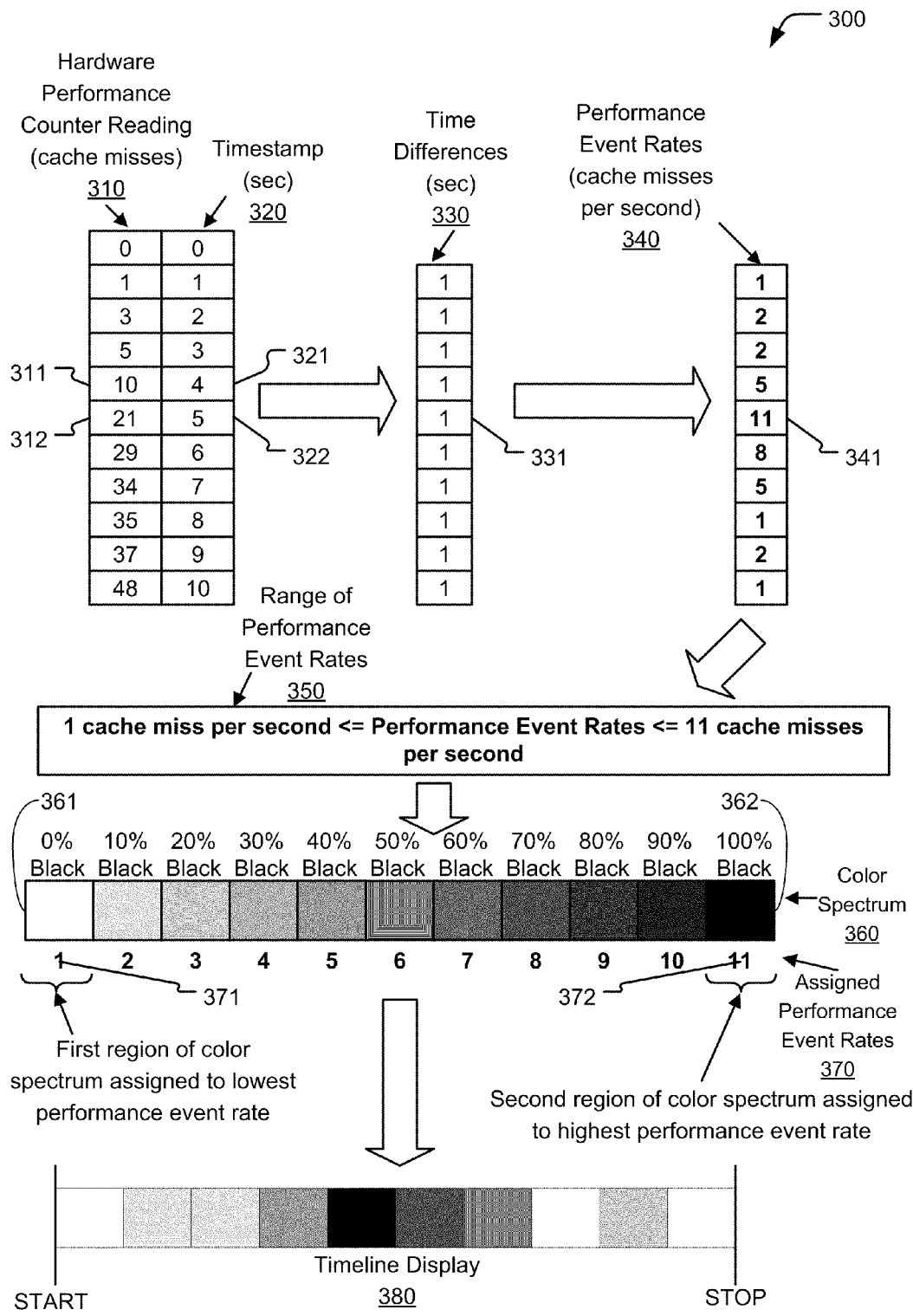
FIG. 3 is a diagram to illustrate a particular embodiment of a method of assigning a color spectrum to a range of performance event rates.

FIG. 3 is a diagram that illustrates a particular embodiment of a method 300 of assigning a color spectrum 360 to a range of performance event rates 350. In an illustrative embodiment, the method may be performed by the system 100 of FIG. 1 or the system 200 of FIG. 2.

The method 300 includes sampling a hardware performance counter for a fixed time period, where the hardware performance counter is configured to count a particular performance event. In the particular embodiment illustrated in FIG. 3, eleven hardware performance counter readings 310 are collected over a fixed time period of eleven seconds, each reading bearing a timestamp 320 between 0 seconds and 11 seconds. The hardware performance counter has been configured to count cache misses. In an illustrative embodiment, this portion of the method 300 may be performed by the performance event tracking engine 110 of FIG. 1 or the performance event tracking engine 210 of FIG. 2, and the hardware performance counter readings 310 and the timestamps 320 may be part of the event log 140 of FIG. 1 or the event log 240 of FIG. 2.

The method also includes calculating time differences 330 between each pair of consecutive timestamps 320, and using the time differences 330 to calculate performance event rates 340 for each time segment bound by two consecutive timestamps 320. As an example, consider the hardware performance counter readings 311 and 312 and their associated timestamps 321 and 322, indicating that 10 cache misses had occurred after 4 seconds of the fixed time period had elapsed and 21 cache misses had occurred after 5 seconds of the fixed time period had elapsed. Subtracting the timestamp 322 from the timestamp 321 results in a time difference 331 equal to 1 second. Furthermore, subtracting the hardware performance counter reading 312 from the hardware performance counter reading 311 results in a difference of 11 cache misses, that when divided by the time difference 331 results in a performance event rate 341 of 11 cache misses per second for the time segment bound by the timestamps 321 and 322. In an illustrative embodiment, this portion of the method 300 may be performed by the event log processing engine 120 of FIG. 1 or the event log processing engine 220 of FIG. 2, and the performance event rates 340 may be included in the event rate data 150 of FIG. 1 or the event rate data 250 of FIG. 2.

The method also includes determining a range of performance event rates 350. For example, in the particular embodiment illustrated in FIG. 3, the performance event rates 340 include a low value of 1 cache miss per second and a high value of 11 cache misses per second, so the range of performance event rates 350 may be expressed by the inequality "1 cache miss per second<=Performance Event Rates<=11 cache misses per second". The method 300 also includes assigning performance event rates to the color spectrum 360 based on the range of performance event rates 350. For example, correlations may be established between different regions of the color spectrum 360 and assigned performance event rates 370. In a particular embodiment, the correlations are established so as to evenly distribute the regions of the color spectrum 360 across the assigned performance event rates 370, including assigning a first region of the color spectrum 360 to a lowest performance event rate and assigning a diametrically opposed second region of the color spectrum 360 to a highest performance event rate. For example, in the particular embodiment illustrated in FIG. 3, the color spectrum 360 is evenly distributed across the assigned performance event rates 370, including assigning the 0% Black region 361 to the lowest performance event rate 371 of 1 cache miss per second and assigning the 100% Black region 362 to the highest performance event rate 372 of 11 cache misses per second. Once the correlations between performance event rates and color spectrum regions have been established, the method 300 includes generating a colored timeline display 380 corresponding to the performance event rates 340. In an illustrative embodiment, the range of performance event rates 340 may be determined and assigned to the color spectrum 360 by the display engine 130 of FIG. 1 or the display engine 230 of FIG. 2. In an illustrative embodiment, the display engine 130 of FIG. 1 or the display engine 230 of FIG. 2 may also generate the colored timeline display 380 and display the colored timeline display 380 at a display device, such as a display device of the computer 102 of FIG. 1 or the computer 202 of FIG. 2.

It will be appreciated that the method 300 of FIG. 3 may be used to assign any color spectrum to any range of performance event rates. It should be noted that although the specific embodiment illustrated in FIG. 3 involves a color spectrum comprising multiple hue intensities (e.g., 0%-100%) of the same color hue (e.g., black), the method of FIG. 3 may also be used with a color spectrum that involves multiple color hues (e.g., the standard visible color spectrum ranging from violet to red). It will further be appreciated that the method 300 of FIG. 3 may be used to evenly distribute a color spectrum across a range of performance event rates, making the visual identification of high or low performance event rates easier.

Figure 4:
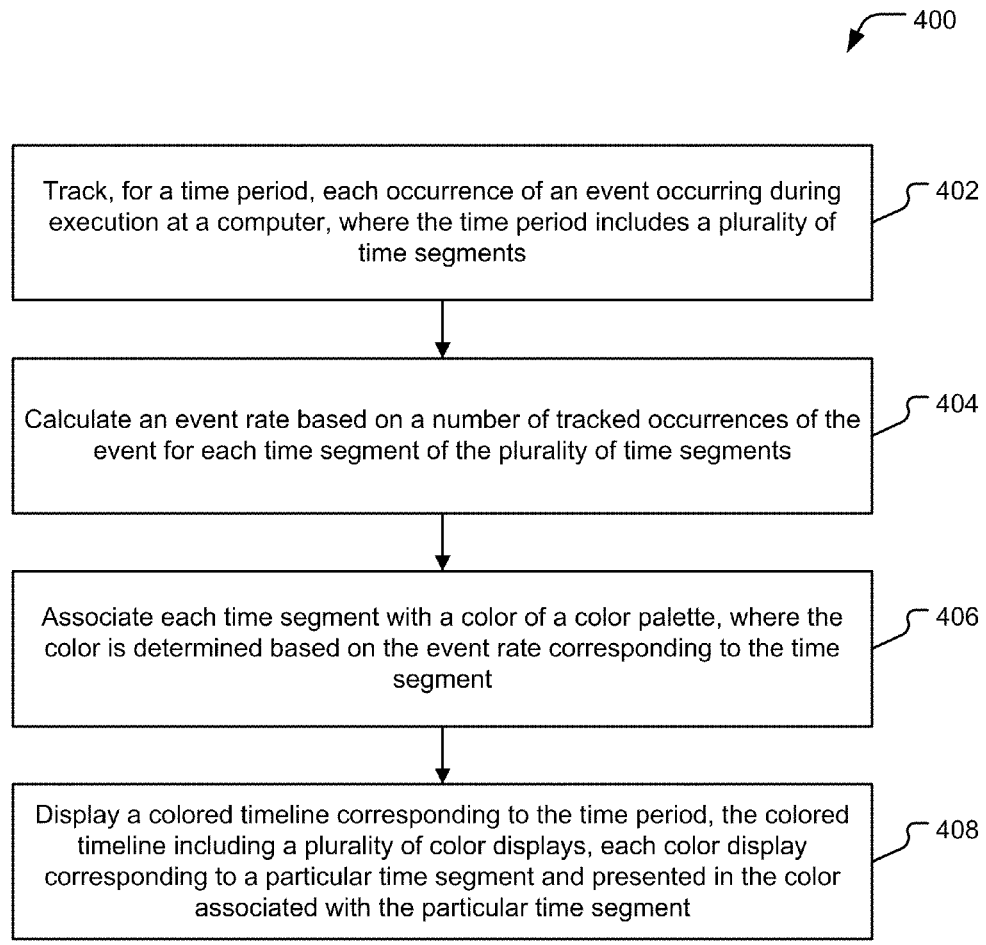
FIG. 4 is a flow diagram of a particular embodiment of a method of measuring and reporting performance event rates at a computer.

FIG. 4 is a flow diagram of a particular embodiment of a method 400 of measuring and reporting performance event rates at a computer. In an illustrative embodiment, the method 400 may be performed by the system 100 of FIG. 1 or the system 200 of FIG. 2. The method includes tracking each occurrence of an event occurring during a time period of execution at a computer, as shown at 402. The time period includes a plurality of time segments. For example, in FIG. 2, the performance event tracking engine 210 may track each occurrence of a branch misprediction at the computer 202 for a time period and generate the event log 240. The method also includes calculating an event rate based on a number of tracked occurrences of the event for each time segment of the plurality of time segments, at 404. For example, in FIG. 2, the event log processing engine 220 may use the event log 240 to calculate the event rate data 250, where the event rate data 250 includes a branch misprediction rate for each time segment. In a particular embodiment, the branch misprediction rate for each time segment may be calculated as described with reference to the performance event rates 340 of FIG. 3.

The method 400 includes associating each time segment with a color of a color palette, where the color is determined based on the event rate corresponding to the time segment, at 406. For example, the display engine 230 of FIG. 2 may associate each time segment with a color determined based on the branch misprediction rate for the time segment. In a particular embodiment, the time segments may be associated with colors as described with reference to the color spectrum 360 of FIG. 3 and the assigned performance event rates 370 of FIG. 3. The method 400 also includes displaying a colored timeline corresponding to the time period, the colored timeline including a plurality of color displays, at 408. Each color display corresponds to a particular time segment and is presented in the color associated with the particular time segment. For example, in FIG. 2, the display engine 230 may display the colored timeline 232. In a particular embodiment, the colored timeline corresponding to the time period may be generated as described with reference to the timeline display 380 of FIG. 3.

It will be appreciated that the method 400 of FIG. 4 enables the measurement and reporting of performance event rate information at a computer. It will also be appreciated that the method 400 of FIG. 4 associates time segments with colors based on performance event rates, so that portions of the displayed timeline corresponding to time segments with very high or very low performance event rates may be visually identified.

Figure 5:
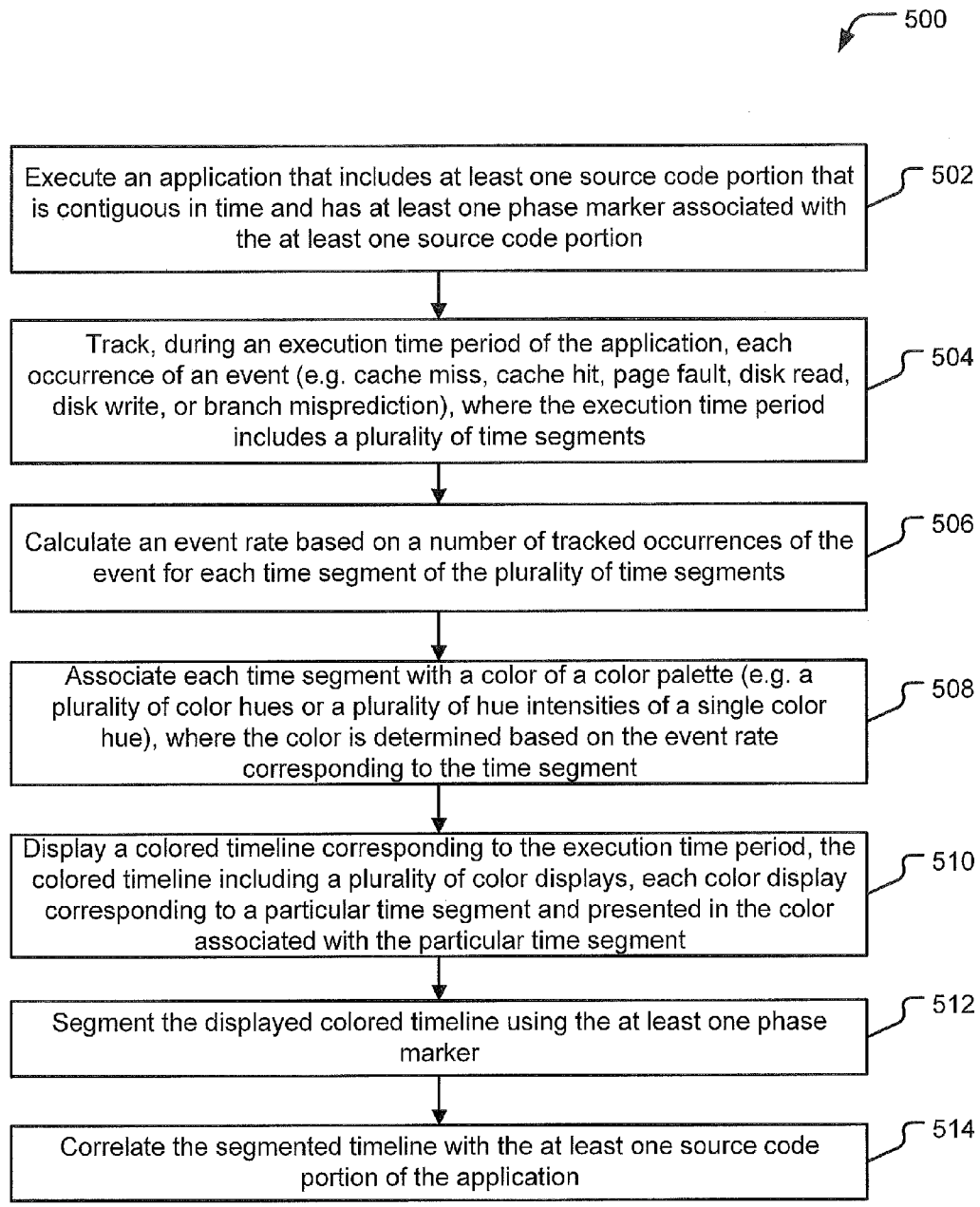
FIG. 5 is a flow diagram of a particular embodiment of a method of measuring and reporting performance event rates at a computer using phase markers.

FIG. 5 is a flow diagram of a particular embodiment of a method 500 of measuring and reporting performance event rates at a computer using phase markers. Phase markers may be inserted into a software application at specific software modules or around specific source code portions that are contiguous in time (e.g., source code loops), so that performance event data related to the specific modules or specific source code portions may easily be segmented and identified. In an illustrative embodiment, the method 500 may be performed by the system 100 of FIG. 1 or the system 200 of FIG. 2. The method includes executing an application at a computer where the application includes at least one source code portion that executes contiguously in time and has at least one phase marker associated with the at least one source code portion, at 502. For example, in FIG. 2, the computer 202 may execute an application that includes at least one source code portion that executes contiguously in time and has at least one phase marker associated with the at least one source code portion. The method also includes tracking, during an execution time period of the application, each occurrence of an event (e.g., a cache miss, a cache hit, a page fault, a disk read, a disk write, or a branch misprediction), at 504. The execution time period includes a plurality of time segments. For example, in FIG. 2, the performance event tracking engine 210 may track each occurrence of a cache miss during execution of the application during the execution time period and generate the event log 240.

The method includes calculating an event rate based on a number of tracked occurrences of the event for each time segment of the execution time period, at 506. For example, in FIG. 2, the event log processing engine 220 may use the event log 240 to calculate the event rate data 250, where the event rate data 250 includes a cache miss rate for each time segment. In a particular embodiment, the cache miss rate for each time segment may be calculated as described with reference to the performance event rates 340 of FIG. 3. The method also includes associating each time segment with a color of a color palette (e.g. a plurality of color hues or a plurality of hue intensities of a single color hue), at 508. The color is determined based on the event rate corresponding to the time segment. For example, the display engine 230 of FIG. 2 may associate each time segment with a color determined based on the cache miss rate for the time segment. In a particular embodiment, the time segments may be associated with colors as described with reference to the color spectrum 360 of FIG. 3 and the assigned performance event rates 370 of FIG. 3. The method 500 includes displaying a colored timeline corresponding to the time period, the colored timeline including a plurality of color displays, at 510. Each color display corresponds to a particular time segment and is presented in the color associated with the event rate data calculated for the particular time segment. For example, in FIG. 2, the display engine 230 may display the colored timeline 232, where each color display of the colored timeline 232 corresponds to a particular time segment.

The method 500 also includes segmenting the displayed colored timeline using the at least one phase marker, at 512, and correlating the segmented timeline with the at least one source code portion of the application, at 514. For example, in FIG. 2, the display engine 230 may segment the colored timeline 232 using the at least one phase marker, correlate the resulting segmented colored timeline with the application that includes the at least one source code portion, and further correlate the resulting segmented colored timeline with the at least one source code portion of the application. In a particular embodiment, the colored timeline may be segmented by marking each portion of the colored timeline that corresponds to an iteration of the source code portion. The use of phase markers to segment a colored timeline is further described herein with reference to FIG. 7.

It will be appreciated that the method 500 of FIG. 5 may be used by software developers to insert phase markers into source code portions for an application that execute contiguously and then correlate measured performance event data with phase marked source code portions. For example, the method 500 of FIG. 5 may be used by software developers to determine what source code portions cause a high rate of performance events generally associated with lowered performance, such as cache misses, page faults, disk reads, disk writes, and branch mispredictions. As another example, the method 500 of FIG. 5 may be used by software developers to determine what source code portions have a low rate of performance events generally associated with improved performance, such as cache hits. It will thus be appreciated that the method 500 of FIG. 5 may be used by software developers to discover and diagnose performance bottlenecks in a software application.

Additionally, it will be appreciated that the method 500 of FIG. 5 enables users to select how displayed timelines should be colored (e.g., using multiple color hues or using multiple hue intensities of a single color hue), resulting in a more customized user experience. For example, a color-blind user may opt to have displayed timelines colored in multiple hue intensities of a single color hue that the user can see, rather than having the displayed color timelines colored in multiple color hues that may include one or more color hues that the user is unable to see.

Figure 6:
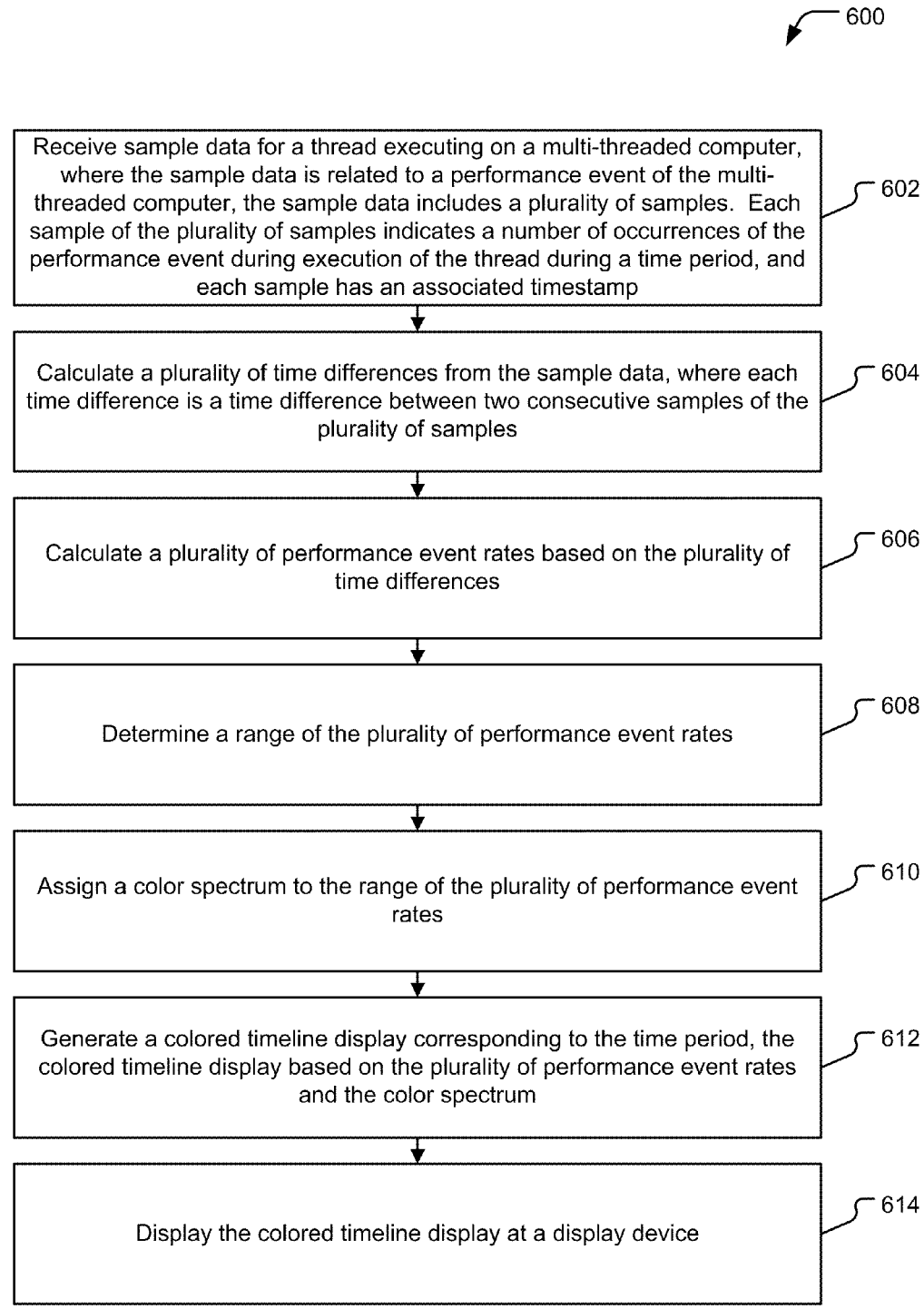
FIG. 6 is a flow diagram of another particular embodiment of a method of assigning a color spectrum to a range of performance event rates.

FIG. 6 is a flow diagram of a particular embodiment of a method 600 of assigning a color spectrum to a range of performance event rates. In an illustrative embodiment, the method 600 of FIG. 6 may be performed by the system 100 of FIG. 1 or the system 200 of FIG. 2. The method 600 includes receiving sample data for a thread executing at a multi-threaded computer, where the sample data is related to a performance event of the multi-threaded computer, at 602. The sample data includes a plurality of samples, and each sample of the plurality of samples indicates a number of occurrences of the performance event during execution of the thread during a time period. Each sample also has an associated timestamp. For example, in FIG. 1, the event log processing engine 120 at the computer 102 may receive the event log 140, where each record 144 in the event log 140 includes a number of performance event occurrences 142 and a timestamp. The method also includes calculating a plurality of time differences from the sample data, at 604. Each time difference is a time difference between two consecutive samples of the plurality of samples. For example, in FIG. 1, the event log processing engine 120 may calculate a plurality of time differences, where each time difference is the time difference between two consecutive records in the event log 140. In a particular embodiment, the plurality of time differences may be calculated as described with reference to the time differences 330 of FIG. 3.

The method 600 also includes calculating a plurality of performance event rates based on the plurality of time differences, at 606. For example, in FIG. 1, the event log processing engine 120 may use the event log 140 to calculate the event rate data 150, where the event rate data 150 includes a plurality of performance event rates. In a particular embodiment, the plurality of performance event rates may be calculated as described with reference to the performance event rates 340 of FIG. 3. The method 600 includes determining a range of the plurality of performance event rates, at 608, and assigning a color spectrum to the range of the plurality of performance event rates, at 610. For example, in FIG. 1, the display engine 130 may determine the range of performance event rates based on the event rate data 150 and may assign a color spectrum to the determined range of performance event rates. In a particular embodiment, the range of performance event rates may be determined as described with reference to the range of performance event rates 350 of FIG. 3. and the color spectrum may be assigned to the determined range of performance event rates as described with reference to the color spectrum 360 of FIG. 3 and the assigned performance event rates 370 of FIG. 3.

The method 600 also includes generating a colored timeline display corresponding to a time period, the colored timeline display based on the plurality of performance event rates and the color spectrum, at 612. For example, in FIG. 1, the display engine 130 may generate a colored timeline display such as the timeline 131, 132, 133, or 134. In a particular embodiment, the colored timeline display may be generated as described with reference to the colored timeline display 380 of FIG. 3. The method 600 concludes by displaying the colored timeline display at a display device, at 614. For example, the display engine 130 of FIG. 1 may display the timeline 131, 132, 133, or 134 at a display device of the computer 102.

It will be appreciated that the method 600 of FIG. 6 may be used to assign any color spectrum to any range of performance event rates. It will further be appreciated that the method 600 of FIG. 3 may be used to evenly distribute a color spectrum across a range of performance event rates, making visual identification of high or low performance event rates easier.

Figure 7:
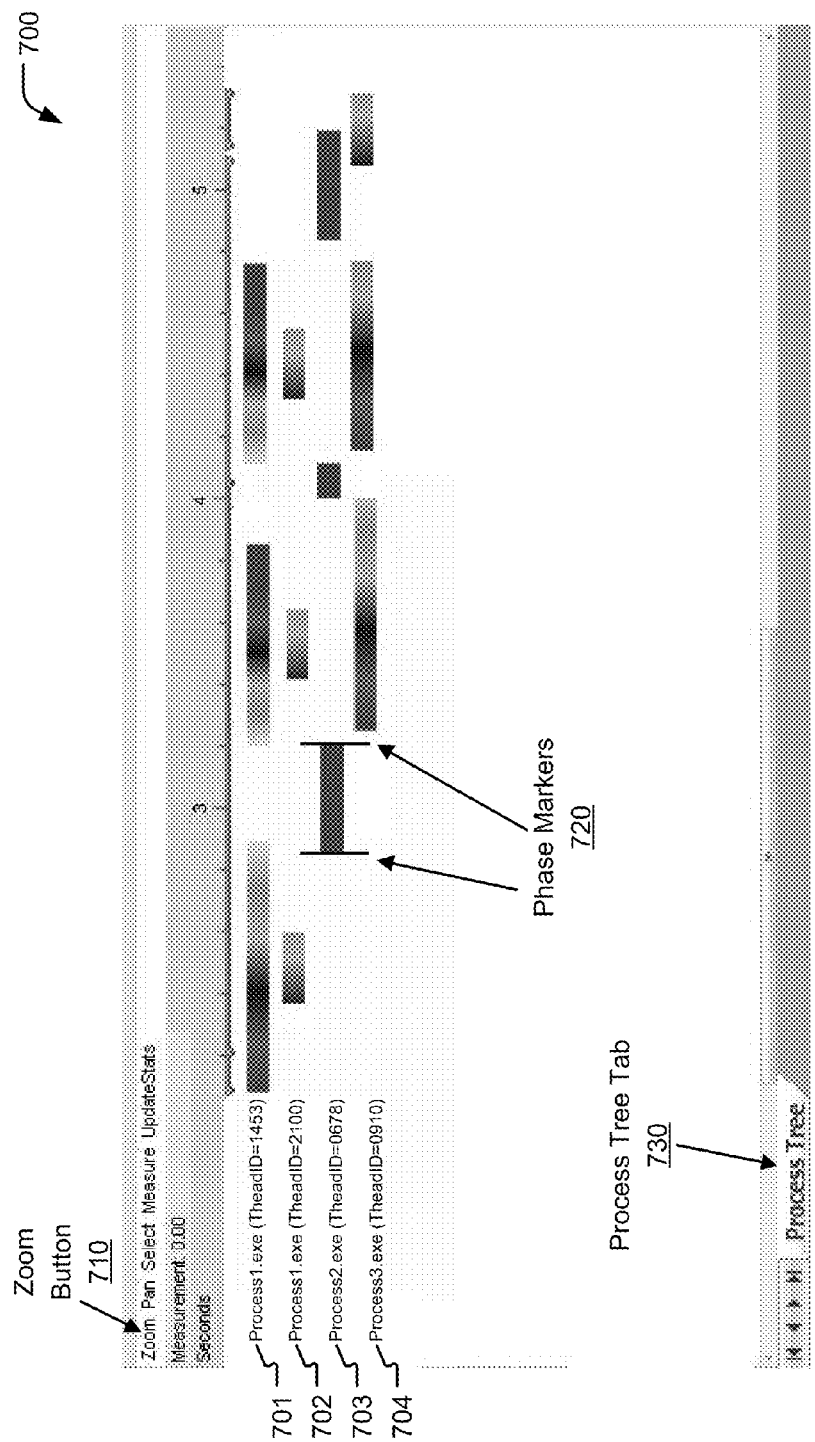
FIG. 7 is a screenshot of a particular embodiment of a performance event rate report.

FIG. 7 is a screenshot of a particular embodiment of a performance event rate report 700. In an illustrative embodiment, the performance event rate report may be generated by the display engine 130 of FIG. 1 or the display engine 230 of FIG. 2, and may be displayed at a display device of the computer 102 of FIG. 1 or the computer 202 of FIG. 2.

In the particular embodiment illustrated in FIG. 7, the performance event rate report 700 is displaying colored timelines for four threads. A timeline 701 and a timeline 702 are associated with different threads (i.e., 1453 and 2100, respectively) of the same process (i.e., Process1.exe). A timeline 703 and a timeline 704 are each associated with a different process (i.e., Process2.exe and Process3.exe, respectively) than are the timelines 701 and 702.

In addition to displaying the timelines 701-704, the performance event rate report 700 may include functionality such as a zoom button 710 to focus in on a selected portion of a timeline and a process tree tab 730 to view call stack and process tree information for one or more of the timelines 701-704. The performance event rate report 700 may also support timeline segmentation on the basis of phase markers. For example, in the specific embodiment illustrated in FIG. 7, a portion of the timeline 703 for Process2.exe has been segmented using the phase markers 720. The use of phase markers may enable application programmers to correlate performance event rate information with specific source code, so that application programmers may discover and diagnose performance bottlenecks in software applications.

It will thus be appreciated that the performance event rate report 700 may provide a graphical view of performance event timelines on a per-process and per-thread basis. It will further be appreciated that the performance event rate report 700 also provides a graphical view of call stack and phase marker information, so that the call stack and phase marker information may conveniently be viewed along with the timelines.

Figure 8:
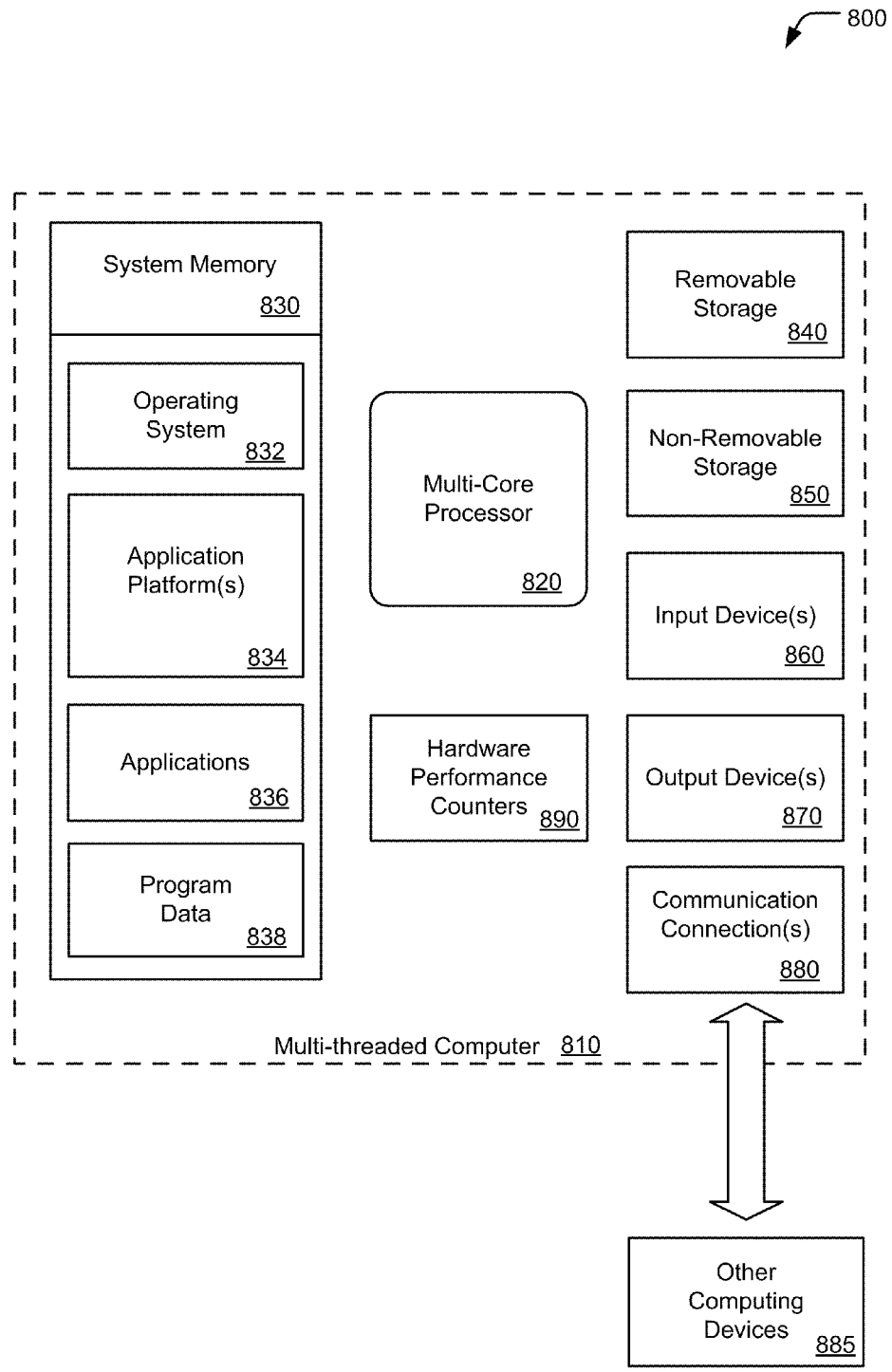
FIG. 8 is a block diagram of a computing environment including a mulit-threaded computer operable to support embodiments of computer-implemented methods, computer program products, and system components as illustrated in FIGS. 1-7.

FIG. 8 shows a block diagram of a computing environment 800 including a multi-threaded computer 810 operable to support embodiments of computer-implemented methods, computer program products, and system components according to the present disclosure. In an illustrative embodiment, the multi-threaded computer 810 may include the computer 102 of FIG. 1 or the computer 202 of FIG. 2. For example, the multi-threaded computer 810 may be a desktop computer, a laptop computer, or a server.

The multi-threaded computer 810 typically includes at least one processor and system memory 830. In a particular embodiment, the multi-threaded computer 810 may include a multi-core processor 820 that has multiple processing cores and supports multiple simultaneous instruction execution pipelines. Depending on the exact configuration and type of computer, the system memory 830 may be volatile (such as random access memory or "RAM"), non-volatile (such as read-only memory or "ROM," flash memory, and similar memory devices that maintain the data they store even when power is not provided to them) or some combination of the two. The system memory 830 typically includes an operating system 832, one or more application platforms 834, one or more applications 836, and may include program data 838. In a particular embodiment, the system memory 830 may include the performance event tracking engine 110 of FIG. 1, the performance event tracking engine 210 of FIG. 2, the event log processing engine 120 of FIG. 2, the event log processing engine 220 of FIG. 2, the display engine 130 of FIG. 1, the display engine 230 of FIG. 2, the reporting engine 260 of FIG. 2, and the context engine 280 of FIG. 2.

The multi-threaded computer 810 may also have additional features or functionality. For example, the multi-threaded computer 810 may also include removable and/or non-removable additional data storage devices such as magnetic disks, optical disks, tape, and standard-sized or miniature flash memory cards. Such additional storage is illustrated in FIG. 8 by removable storage 840 and non-removable storage 850. Computer storage media may include volatile and/or non-volatile storage and removable and/or non-removable media implemented in any method or technology for storage of information such as computer-readable instructions, data structures, program components or other data. The system memory 830, the removable storage 840 and the non-removable storage 850 are all examples of computer storage media. The computer storage media includes, but is not limited to, RAM, ROM, electrically erasable programmable read-only memory (EEPROM), flash memory or other memory technology, compact disks (CD), digital versatile disks (DVD) or other optical storage, magnetic cassettes, magnetic tape, magnetic disk storage or other magnetic storage devices, or any other medium which can be used to store the desired information and which can be accessed by the multi-threaded computer 810. Any such computer storage media may be part of the multi-threaded computer 810.

The multi-threaded computer 810 may include input device(s) 860 (e.g., a keyboard, a mouse, or a light pen) and output device(s) 870 (e.g., a display device or a printer). In a particular embodiment, the output device(s) 870 include a display device configured to display one or more colored timelines generated by the display engine 130 of FIG. 1 or the display engine 230 of FIG. 2. The multi-threaded computer 810 also contains one or more communication connections 880 that allow the computing device 810 to communicate with other computing devices 885, such as one or more computing systems or other servers, over a wired or a wireless network. The one or more communication connections 880 are an example of communication media. By way of example, and not limitation, communication media may include wired media such as a wired network or direct-wired connection, and wireless media such as acoustic, RF, infrared and other wireless media. It will be appreciated, however, that not all of the components or devices illustrated in FIG. 8 or otherwise described in the previous paragraphs are necessary to support embodiments as herein described.

The multi-threaded computer 810 also includes one or more hardware performance counters 890. The hardware performance counters 890 are special-purpose registers that may be dynamically configured to track the occurrence of particular performance events at the multi-threaded computer 810. For example, a performance event tracking engine, such as the performance event tracking engine 110 of FIG. 1 or the performance event tracking engine 210 of FIG. 2, may configure the one or more hardware performance counters 890 to track the occurrences of cache misses, cache hits, page faults, disk reads, disk writes, and branch mispredictions at the multi-threaded computer 810. The number and capability of the hardware performance counters 890 may be determined by hardware properties of the multi-threaded computer 810. For example, if the multi-threaded computer 810 is an Intel® Pentium 4 computer, than the multi-threaded computer 810 has eighteen available hardware performance counters 890.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, or steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method described in connection with the embodiments disclosed herein may be embodied directly in hardware, in a software module executed by a processor, or in a combination of the two. A software module may reside in computer readable media, such as random access memory (RAM), flash memory, read only memory (ROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor or the processor and the storage medium may reside as discrete components in a access gateway or computer system.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present invention is not intended to be limited to the embodiments shown herein but is to be accorded the widest scope possible consistent with the principles and novel features as defined by the following claims.

What is claimed is:

1. A method executable by a processor comprising:
   tracking, for a time period, each occurrence of an event occurring during execution at a computer, wherein the time period includes a plurality of time segments;
   calculating an event rate for each time segment, each event rate based on a time difference between two consecutive time segments and based on a number of tracked occurrences of the event for a corresponding time segment of the plurality of time segments;
   assigning a color palette to a range of event rates, the range of event rates based on the calculated event rates;
   associating each time segment with a color of the color palette, wherein the color is determined based on the event rate corresponding to the time segment; and
   displaying a colored timeline corresponding to the time period, the colored timeline including a plurality of color displays corresponding to the plurality of time segments, each color display of the plurality of color displays corresponding to a particular time segment of the plurality of time segments and presented in the color associated with the particular time segment.

2. The method of claim 1, wherein the color palette comprises one of a plurality of color hues, or a plurality of color hue intensities of a single color hue.

3. The method of claim 1, wherein tracking each occurrence of the event includes tracking call stack information of the computer associated with each occurrence of the event.

4. The method of claim 1, further comprising receiving a selection of a portion of the colored timeline.

5. The method of claim 4, further comprising displaying a performance report for the selected portion of the colored timeline.

6. The method of claim 1, further comprising segmenting the colored timeline using at least one phase marker.

7. The method of claim 6, wherein the at least one phase marker indicates a portion of application source code that executes contiguously in time.

8. The method of claim 1, wherein the computer is a multi-core computer and wherein tracking each occurrence of the event comprises tracking each occurrence of the event at each core of the multi-core computer.

9. The method of claim 1, wherein the event to be tracked is based on received user input.

10. The method of claim 1, wherein the colored timeline includes multiple channels, corresponding to a plurality of threads, where each of the plurality of threads is associated with a distinct process.

11. The method of claim 10, further comprising selectively isolating performance event rate information for an execution time period of a selected thread.

12. The method of claim 1, wherein the event rate for a particular time segment is determined based on a pair of consecutive records in an event log and wherein the event rate indicates a number of cache misses per second during the particular time segment of the time period.

13. The method of claim 1, wherein the event rate for a particular time segment is determined based on a pair of consecutive records in an event log and wherein the event rate for the particular time segment indicates a number of branch mispredictions per second during the particular time segment of the time period.

14. The method of claim 1, wherein the colored timeline is segmented by marking a portion of the colored timeline that corresponds to an iteration of a source code loop.

15. The method of claim 1, wherein the colored timeline displays performance event rate information for time segments during which a thread is executing, and selectively hides time segments during which the thread is not executing.

16. A method executable by a processor comprising:
receiving sample data for a thread executing on a multi-threaded computer, wherein the sample data is related to a performance event of the multi-threaded computer, wherein the sample data includes a plurality of samples, wherein each sample of the plurality of samples indicates a number of occurrences of the performance event during execution of the thread during a time period, and wherein each sample has an associated timestamp;
calculating a plurality of time differences from the sample data, wherein each time difference is a time difference between two consecutive samples of the plurality of samples;
calculating a plurality of performance event rates based on the plurality of time differences;
determining a range of the plurality of performance event rates;
assigning a color spectrum to the range of the plurality of performance event rates;
generating a colored timeline display corresponding to the time period, the colored timeline display based on the plurality of performance event rates and the color spectrum; and
displaying the colored timeline display at a display device.

17. The method of claim 16, wherein determining the range of the plurality of performance event rates includes identifying a lowest performance event rate and a highest performance event rate, and wherein assigning the color spectrum to the range includes assigning a first color corresponding to a first region of the color spectrum to the lowest performance event rate and assigning a second color corresponding to a second region of the color spectrum to the highest performance event rate.

18. The method of claim 16, wherein the time period comprises a plurality of time segments, and wherein each of the plurality of performance event rates corresponds to a number of times the performance event occurred during a particular time segment.

19. The method of claim 16, wherein the sample data for the thread is based on data collected by tracking a hardware performance counter associated with the multi-threaded computer.

20. A computer readable storage memory device including instructions executable by a computer to:
receive sample data, the sample data related to a performance event of the computer, wherein the sample data includes a plurality of samples, wherein each sample of the plurality of samples indicates a number of occurrences of the performance event during execution of the computer during a time period, and wherein each sample has an associated timestamp;
calculate a plurality of time differences from the sample data, wherein each time difference is a time difference between two consecutive samples of the plurality of samples;
calculate a plurality of performance event rates based on the plurality of time differences;
determine a range of the plurality of performance event rates;
assign a color spectrum to the range of the plurality of performance event rates;
generate a colored timeline display corresponding to the time period, the colored timeline display based on the plurality of performance event rates and the color spectrum; and
display the colored timeline display at a display device.

* * * * *